Nov. 24, 1970  F. HEGAR ETAL  3,541,888
MECHANICAL POWER TRANSMITTING MECHANISM
Filed April 14, 1969  3 Sheets-Sheet 3

FRANK HEGAR
VEARL DAY
*INVENTORS.*
BY
*BUCKHORN, BLORE, KLARQUIST & SPARKMAN*
*ATTORNEYS*

United States Patent Office 3,541,888
Patented Nov. 24, 1970

3,541,888
MECHANICAL POWER TRANSMITTING MECHANISM
Frank Hegar, Oregon City, and Vearl Day, Beaverton, Oreg., assignors to Warn-Belleview, Inc., Portland, Oreg., a corporation of Oregon
Filed Apr. 14, 1969, Ser. No. 815,920
Int. Cl. B66d 1/00; F16h 5/52
U.S. Cl. 74—810
8 Claims

ABSTRACT OF THE DISCLOSURE

A mechanical power transmitting mechanism particularly useful for a winch is disclosed which provides a low friction loss spur gear drive for the winch drum in the rope take up direction and which snubs reverse rotation of the drum under control of reverse rotation of the input shaft. This snubbing action is provided by a self locking worm and gear assembly connected in parallel with a portion of the spur gear drive in combination with an overrunning clutch in series with such portion of the spur gear drive and an overrunning clutch in series with the worm and gear assembly.

BACKGROUND OF INVENTION

The present invention was developed in connection with a winch and in particular a winch of relatively small size which can be driven by an electric motor supplied from a storage battery. One example is a winch suitable for mounting on a truck body as part of a hoist for loading heavy objects in the truck and unloading them from the truck. The rope drum of this type of winch as well as the rope drum of winches of much larger size have typically been driven from the motor in the rope take up direction through a speed reducing worm and worm gear assembly.

A worm and worm gear drive has the advantage that it can be made self locking to prevent rotation of the drum in the rope payout direction as a result of force applied through the rope when the motor is disconnected from the battery and the motor is free to rotate. A worm and worm gear drive also provides controlled snubbing of rotation of the drum in the rope payout direction when the motor is stopped or electric energy is supplied to the motor to cause it to rotate in the reverse direction.

Worm and worm gear drives inherently have the disadvantage of high friction losses when employed to provide speed reduction and high torque at their outputs. Energy dissipated as heat as a result of these losses must be supplied by the battery in addition to the energy required to move or elevate a load connected to the winch rope. Thus the useful load which can be handled can be materially increased without exceeding the safe power capabilities of a given battery when a drive having low friction losses is employed.

As indicated above, low friction loss, speed reducing drives, for example, a chain of spur gears or other similar gears, such as planatary gears or bevel gears or even chain or belt drives, very much reduce the energy required to handle a given load. These types of drives have the disadvantage, however, that even a small amount of force applied through the winch rope will cause uncontrolled rotation of the winch drum in the reverse or rope payout direction, when the electric power supply is disconnected from the motor. To prevent this type of operation, it is possible to provide an automatically actuated brake system for the drum. Brake systems of this type do not, in general, provide for satisfactory controlled payout of the rope under load conditions.

SUMMARY OF INVENTION

In accordance with the present invention, a simple and effective way has been found to obtain both the advantage of a low friction loss speed reducing drive of the winch drum in the rope take up direction and the advantages of a worm and worm gear snubbing operation when the source of electric power is disconnected from the motor or is connected to the motor to cause rotation of the motor in a reverse direction. The advantages are obtained by connecting a worm and worm gear assembly in parallel with at least a portion of the low friction loss speed reducing drive between the driving motor and the winch drum, and also employing a one way drive clutch in series with the worm and worm gear drive assembly and a similar clutch in series with the low friction loss drive.

When the overrunning clutches referred to above are installed in the proper positions and arranged to transmit rotation in the proper directions and also the drive ratios of the low friction loss drive and of the worm and worm gear assembly are properly selected, the resulting arrangement can be made to automatically shift from a low friction loss drive of the drum in a rope take up direction of rotation to controlled snubbing of the rotation of the winch drum in the rope payout direction of rotation when the motor is disconnected from the power source or is reversed.

A further advantage is that very little power is required to drive the worm in the direction providing controlled snubbing of drum rotation in the rope pay out direction as the worm and worm gear assembly will either be under no substantial load or the energy dissipated by the friction losses will be supplied through the winch rope as a result of lowering a suspended load or other action producing tension in the rope which rotates the drum. Thus rotation of the winch drum in both directions with low energy losses is provided.

Although the drive mechanism of the present invention has been discussed above in connection with a winch drum driven by an electric motor, it is apparent that such mechanism is in fact a mechanical power transmitting mechanism having general utility in any environment in which it is desired to efficiently transmit power in one direction from a mechanical power source such as a motor to a power utilizing device, and to also provide controlled snubbing action for any reverse transmission of power through the power transmitting mechanism which might occur due to forces originating in the power utilizing mechanism.

It is therefore an object of the present invention to provide an improved power transmitting mechanism producing a low friction loss drive between a source of mechanical power and a power utilizing mechanism in one direction and a low friction loss snubbing action for any reaction forces from the power utilizing mechanism.

DESCRIPTION OF THE PREFERRED EMBODIMENT

Figure 1:
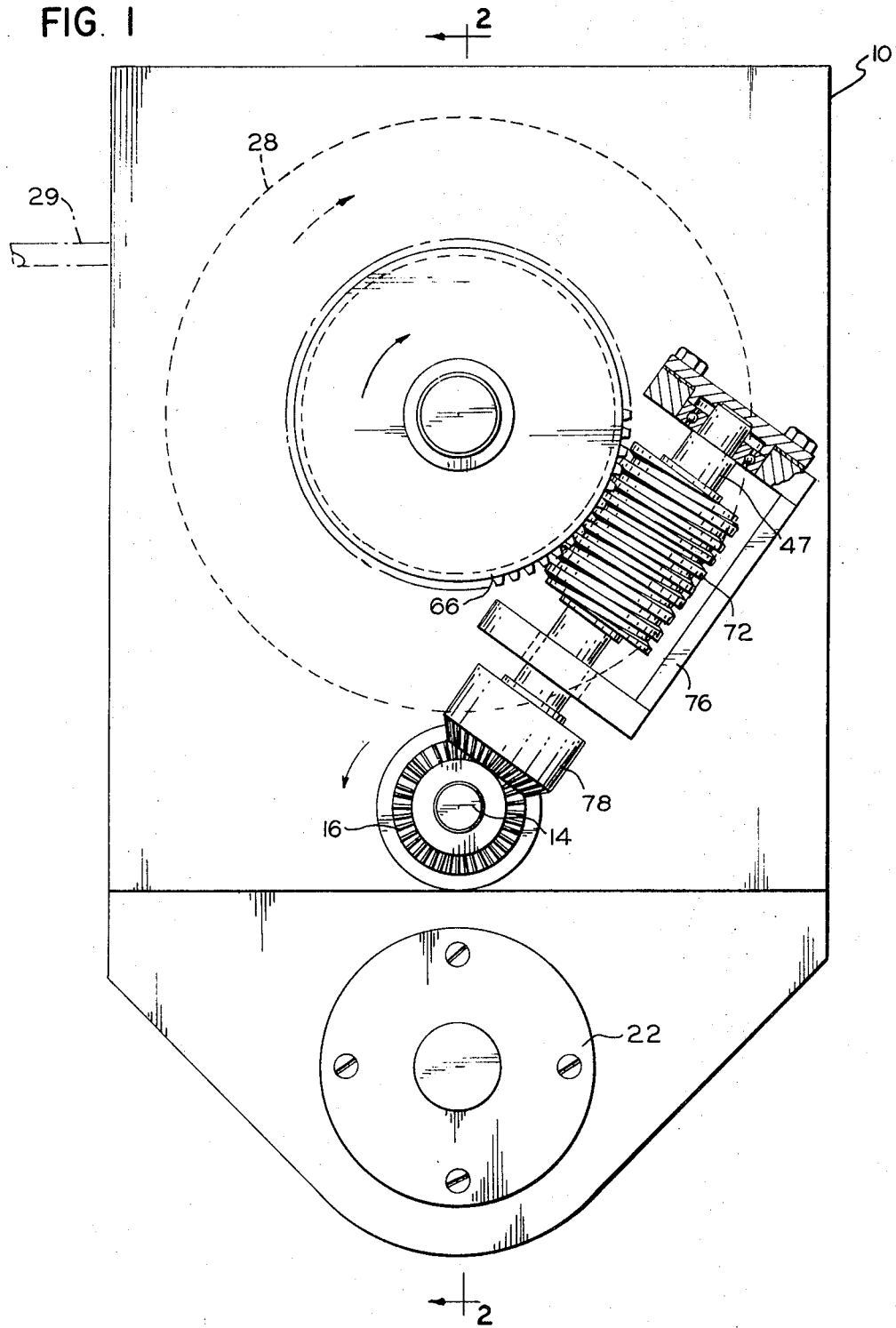
FIG. 1 is a side elevation of a winch incorporating the present invention with parts broken away to show internal structure.
Figure 2:
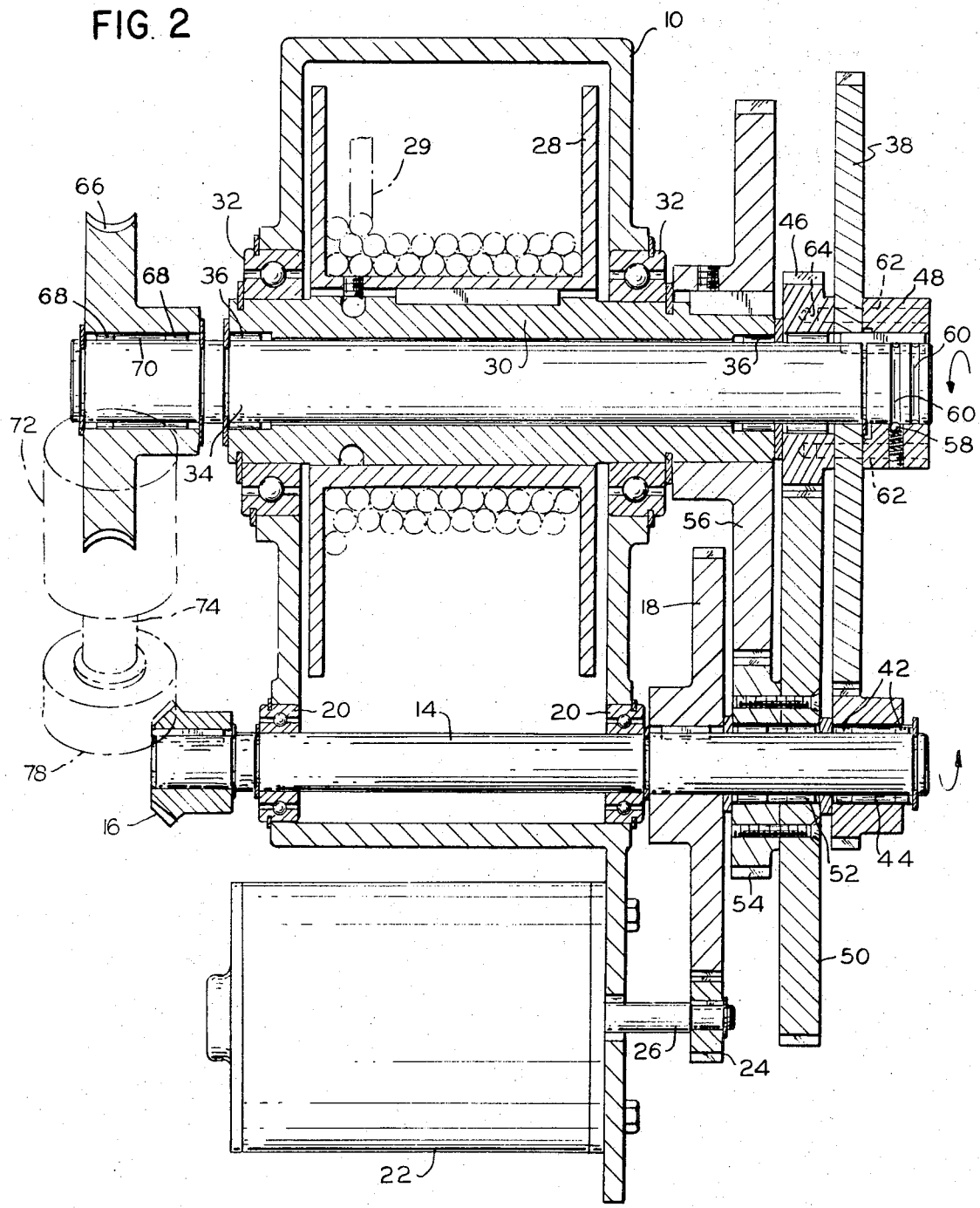
FIG. 2 is a horizontal section taken on the line 2—2 of FIG. 1 with a portion of a worm and worm gear assembly of FIG. 1 shown in phantom view.
Figure 3:
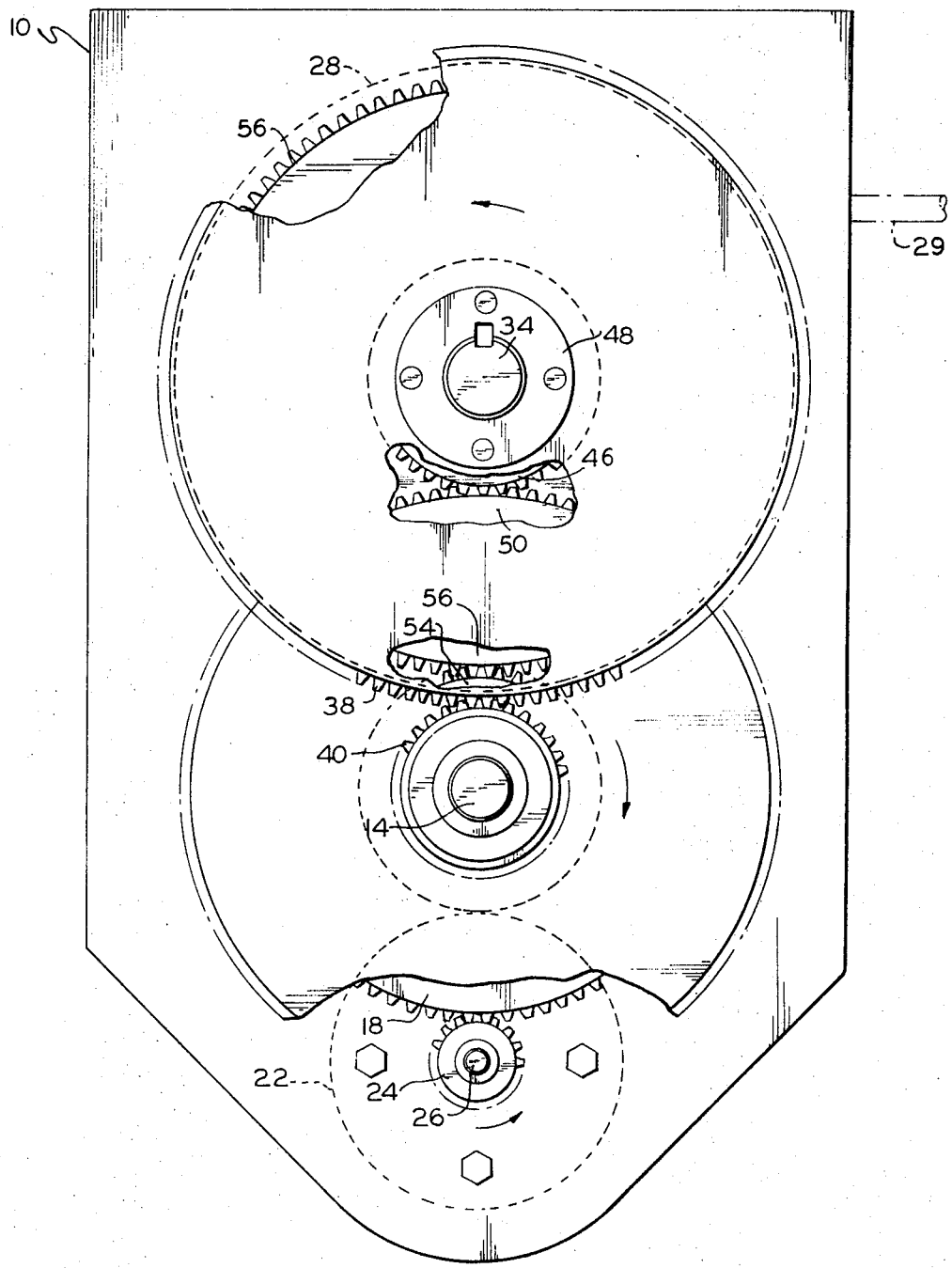
FIG. 3 is a side elevation showing the side of the winch opposite that shown in FIG. 1.

As shown most clearly in FIG. 2, the winch of the present invention includes a frame 10 which can be secured to a suitable vertical or horizontal support in any desired position. An input shaft 14, upon which is concentrically mounted, a bevel gear 16 and a spur gear 18, is journaled for rotation in the frame by ball bearings 20 supported by the side walls of the frame. The bevel gear 16 and spur gear 18 are keyed to the shaft 14 and this shaft is rotatively driven by an electric motor 22 through speed reducing gearing including a pinion 24 keyed to the motor shaft 26 and meshing with the gear 18.

A winch drum 28 upon which at least a part of a rope 29 is wound, is rigidly secured on a sleeve 30 which extends concentrically through the drum. The sleeve 30 is journaled for rotation in the frame 10 by ball bearings 32 adjacent the opposite ends of the drum and supported by the side walls of the frame 10. An output shaft 34 is journaled for rotation in the sleeve 30 by bearing rollers 36. A spur gear 38 is mounted upon and keyed to one end of the output shaft 34.

The output shaft 34 is rotatively driven from the input shaft 14 through a one way drive speed reducing gear drive including a pinion 40 journaled on the shaft 14 by bearing rollers 42 and meshing with the spur gear 38. The pinion 40 has an overrunning clutch formed in part by the rollers 44 shown in FIG. 2. It will be understood that circumferentially extending camming surfaces, not shown, of the type conventionally found in overrunning clutch structures, are formed on the interior of the portion of the pinion 40 surrounding the rollers 44 so that rotation of the shaft 14 in one direction with respect to this pinion will wedge the rollers 44 between the camming surfaces and the surface of the shaft to provide at one way drive in such direction. It will also be understood that relative rotation of the shaft in the opposite direction with respect to the pinion will release the one way drive.

The sleeve 30 carrying the winch drum 28 is rotatively driven from the shaft 34 through speed reducing gearing including a pinion 46 releasably locked to the output shaft 34 by a positive clutch member 48 further described below. The pinion 46 meshes with a spur gear 50 journaled on the input shaft 14 by bearing rollers 52. A pinion 54 is similarly journaled upon the shaft 14 and is rigidly secured to the gear 50. The pinion 54 meshes with a spur gear 56 mounted upon and keyed to the sleeve 30 carrying the clutch drum 28.

The clutch member 48 is mounted for axial sliding movement on one end of the output shaft 34 and carries a spring pressed detent ball 58 in a bore therein. The ball engages in one or the other of a pair of detent grooves 60 adjacent the end of the shaft 34. The clutch member 48 also has a plurality of locking members 62 projecting axially of the shaft 34 through holes in the gear 38. In the position of the clutch member shown in FIG. 2, these locking members extend into holes 64 in the pinion 46 to lock the pinion against rotation with respect to the gear 38 and the shaft 34 and provide a positive drive through speed reducing gears from the output shaft to the sleeve 30 and winch drum 28. When the clutch member 48 is manually moved away from the gear 38, the pinion 46 is unlocked from the output shaft 34 to permit free rotation of the drum 28.

A worm gear 66 is journaled by bearing rollers 68 on the end of the output shaft opposite the end upon which the clutch member 48 is mounted. The worm gear 66 also has an overrunning clutch in its interior of the same type described with respect to the pinion 40, including clutch rollers 70 to provide a one way drive between this gear and the output shaft 34.

A drive worm 72 for the worm gear 66 is mounted rigidly upon a shaft 74 journaled in a bearing bracket 76 secured to the exterior of a side wall of the frame 10. A bevel gear 78 is rigidly secured to an end of the shaft 74 which projects from the bracket 76 and is positioned to mesh with the bevel gear on the end of the input shaft 14. The bevel gears 16 and 78 and worm 72 provide a positive drive between the input shaft 14 and the worm gear.

The overrunning clutch in the pinion 40 forming part of the low friction loss drive between the input shaft 14 and the output shaft 34 locks this pinion to the shaft 14 when the drive from the motor is in the direction which causes the drum 28 to pull in or take up the rope 29. Any reaction forces applied through the rope from the load tending to rotate the drum in the reverse direction will also cause the pinion 40 to lock to the input shaft. In the absence of some type of braking device to prevent or control reverse rotation, such reaction forces will cause uncontrolled reverse rotation of the drum when electric power is disconnected from the motor, since the entire gear train between the drum and the motor is a high efficiency, low friction loss drive.

This uncontrolled reverse rotation can be prevented by snubbing action of the worm 72 and worm gear 66 drive assembly by employing an overrunning clutch in the worm gear 66 which locks when the worm gear 66 is held stationary and the winch drum 28 tends to be rotated in a reverse or rope pay out direction by forces applied through the rope 29. In order to insure this snubbing action the speed ratios of the snubbing mechanism and the drive through the pinion 40 and the gear 38 must be such that the ratio of the speed of the input shaft 14 to that of the output shaft 34, when driving of the worm gear 66 by the worm 72 controls the relative rotation of the shaft, must be greater than this ratio when the drive through the pinion 40 and the gear 38 controls the relative rotation of the two shafts.

In a specific structure of the type shown in the drawings the direction of rotation of the various elements may be in the direction of the arrows when the drive is through the pinion 40 and gear 38. The ratio of the speed of the input shaft to the speed of the output shaft during this time may be approximately 4 to 1, whereas this ratio during the snubbing action may be approximately 50 to 1. This means that this ratio during the snubbing action is 12.5 times as great as this ratio when the drive is through the pinion and gear. Under these conditions, rotation of the input shaft at a speed of 400 r.p.m., for example, will drive the output shaft through the pinion 40 and gear 38 at a speed of 100 r.p.m. while the worm gear 66 will be driven through the worm at 8 r.p.m. The overrunning clutch in the pinion 40 will be engaged to cause the output shaft 34 to be rotated at a greater speed than the worm gear 66. The overrunning clutch in the worm gear 66 is thus released to allow the drive to continue through the high efficiency gear drive provided by the pinion 40 and gear 38.

If the motor is disconnected from its electric power source while a load is suspended by the rope 29 or a force is otherwise applied to the drum through the rope, a torque will be applied to the drum 28 tending to reverse its direction of rotation. Any back lash between the worm 72 and worm gear 66 or between the bevel gears 16 and 78 will ordinarily have been taken up by the drive of the worm gear through the worm. Since the worm gear will not drive the worm, the overrunning clutch in the worm gear will engage to prevent any reverse rotation of the drum.

The clutch in the pinion 40 will still be engaged and tend to drive the input shaft 14 in a reverse direction to thus drive the worm 72 in a direction tending to drive the worm gear 66 in a reverse direction to allow reverse rotation of the drum 28. In the example just given a 10° reverse rotation of the output shaft 34 would rotate the input shaft 14 and the worm 70 through 40° and this would rotate the worm gear through 0.8° only. Even this amount of rotation of the worm gear will not occur if there is any backlash between the gear 38 and pinion 40 and between the bevel gears 16 and 78. In any event, continued reverse rotation of the output shaft 34 will not occur unless the amount of rotation of the worm gear as a result of a reverse drive through the gear chain just traced is at least equal to the amount of rotation of the output shaft 34. This is not the case in the example given and, in general, reverse rotation of the drum will not occur when the motor is disconnected from its source of power as long as the ratios of the speeds of the input shaft to the corresponding speeds of the output shaft have the relationship also given.

If electric energy is supplied to the motor 22 to drive it in the reverse direction to that which caused rotation of the drum 28 in a rope take up direction, the worm 72 rotates the worm gear 66 in a direction tending to disengage the overrunning clutch in the worm gear and, if any force is being applied to the drum from the rope tending to rotate the drum in a rope payout direction, the output shaft 34 will follow the worm gear 66 at the same speed of rotation as the worm gear. This speed is directly proportional to the speed of rotation of the input shaft 14, and to the speed of rotation of the motor shaft 26.

It will be apparent from the above discussion, that under the conditions just described, the pinion 40 will be driven by the output shaft 34 through the gear 38 at a speed of rotation which is less than that of the input shaft 14, and in the same direction as the input shaft 14. This means that the overrunning clutch in the pinion 40 will be released. The result is the driving of the drum 28 in the rope take up direction through a low friction loss drive when the motor causes rotation of the input shaft in one direction and controlled snubbing of any reverse rotation of the drum with very little energy being supplied by the motor even when the worm and worm gear drive is under heavy load.

We claim:

1. A mechanical power transmitting mechanism comprising:
   rotatably mounted input and output members;
   drive means including one way clutch means between said members for rotatively driving said output member in one direction by said input member when said input member is rotated in a first direction;
   snubbing means in parallel with said drive means and including self locking worm and worm gear means and also including one way clutch means between said worm gear and said output member which is caused to engage when the output member is rotated in a direction which is the reverse of said one direction;
   said worm being connected to said input member for rotation in a direction which causes such rotation of said worm gear as to tend to disengage the last mentioned one way clutch means when said first direction of rotation of said input member is reversed; said snubbing means and said drive means having respective gear ratios which produce a ratio of the speed of the input member to the speed of the output member when said worm gear is being rotated as just described above greater than the ratio of the speed of the input member to the speed of the output member when said output member is being rotated through said drive means.

2. The mechanism of claim 1 in which said drive means has low friction losses compared to said worm and worm gear means under similar load conditions.

3. The mechanism of claim 1 in which said drive means is a series of meshing gears having parallel axes.

4. The mechanism of claim 1 in which said drive mechanism is in series of spur gears.

5. The mechanism of claim 4 in which said input member and said output member are a rotatably mounted input shaft and a rotatably mounted output shaft respectively, said mechanism includes a bevel gear drive between said input shaft and said worm and said worm gear is journaled on said output shaft.

6. The mechanism of claim 1 in which said drive means is a speed reducing drive means and said mechanism also includes a winch drum and a second speed reducing drive means between said output member and said winch drum for rotating said drum when said output member is rotated.

7. The mechanism of claim 6 in which said second speed reducing drive means includes a releasable positive clutch means to provide for free rotation of said drum when said clutch is released.

8. The mechanism of claim 7 in which said output member is a rotatably mounted shaft, said second drive means includes a pair of gears concentrically journaled on said shaft and said positive clutch means includes a member slidable axially of said shaft for selectively connecting said pair of gears together or disconnecting said pair of gears from each other.

References Cited
UNITED STATES PATENTS

| | | | |
|---|---|---|---|
| 2,884,800 | 5/1959 | Carroll | 74—425 |
| 2,903,901 | 9/1959 | MacDonald | 74—665 X |
| 3,063,708 | 11/1962 | Wollenhaupt | 74—665 X |

LEONARD H. GERIN, Primary Examiner

U.S. Cl. X.R.

254—170